United States Patent [19]

Lucas et al.

[11] 4,055,068
[45] Oct. 25, 1977

[54] PROCESS FOR MANUFACTURING MONOBLOC VEHICLE WHEELS

[75] Inventors: Roger Lucas, Issoire; Jacques Auberger, Jumeaux, both of France

[73] Assignee: FORGEAL, Societe pour le Forgeage et l'Estampage des Alliages Legers, Paris, France

[21] Appl. No.: 674,869

[22] Filed: Apr. 8, 1976

[30] Foreign Application Priority Data

Apr. 9, 1975  France ........................ 75.11725
Dec. 3, 1975  France ........................ 75.37696

[51] Int. Cl.² .................. B21D 22/00; B21H 1/02
[52] U.S. Cl. .......................... 72/356; 29/159.01; 72/364; 72/377
[58] Field of Search .................. 72/356, 377, 364; 29/159 R, 159.01, 159.1

[56] References Cited

U.S. PATENT DOCUMENTS 2,075,294  3/1937  Jeune ......................... 29/159.01
3,220,285  11/1965  Jansen ....................... 29/159.01 X

FOREIGN PATENT DOCUMENTS 1,186,248  4/1959  France
1,491,895  7/1967  France
1,752,895  11/1970  Germany ..................... 29/159.01
507,801  6/1939  United Kingdom Primary Examiner—Leon Gilden
Attorney, Agent, or Firm—Dennison, Dennison, Meserole & Pollack

[57] ABSTRACT

A process for manufacturing monobloc vehicle wheels. A roughly shaped article having the general configuration of a cylindrical disc is further formed in a sequence of steps including die stamping and widening in a press to form the final shape in preparation for finishing operations by conventional mechanical machining. These wheels which may be formed from light aluminum based alloys are especially suitable for large vehicles equipped with pneumatic tires.

4 Claims, 7 Drawing Figures

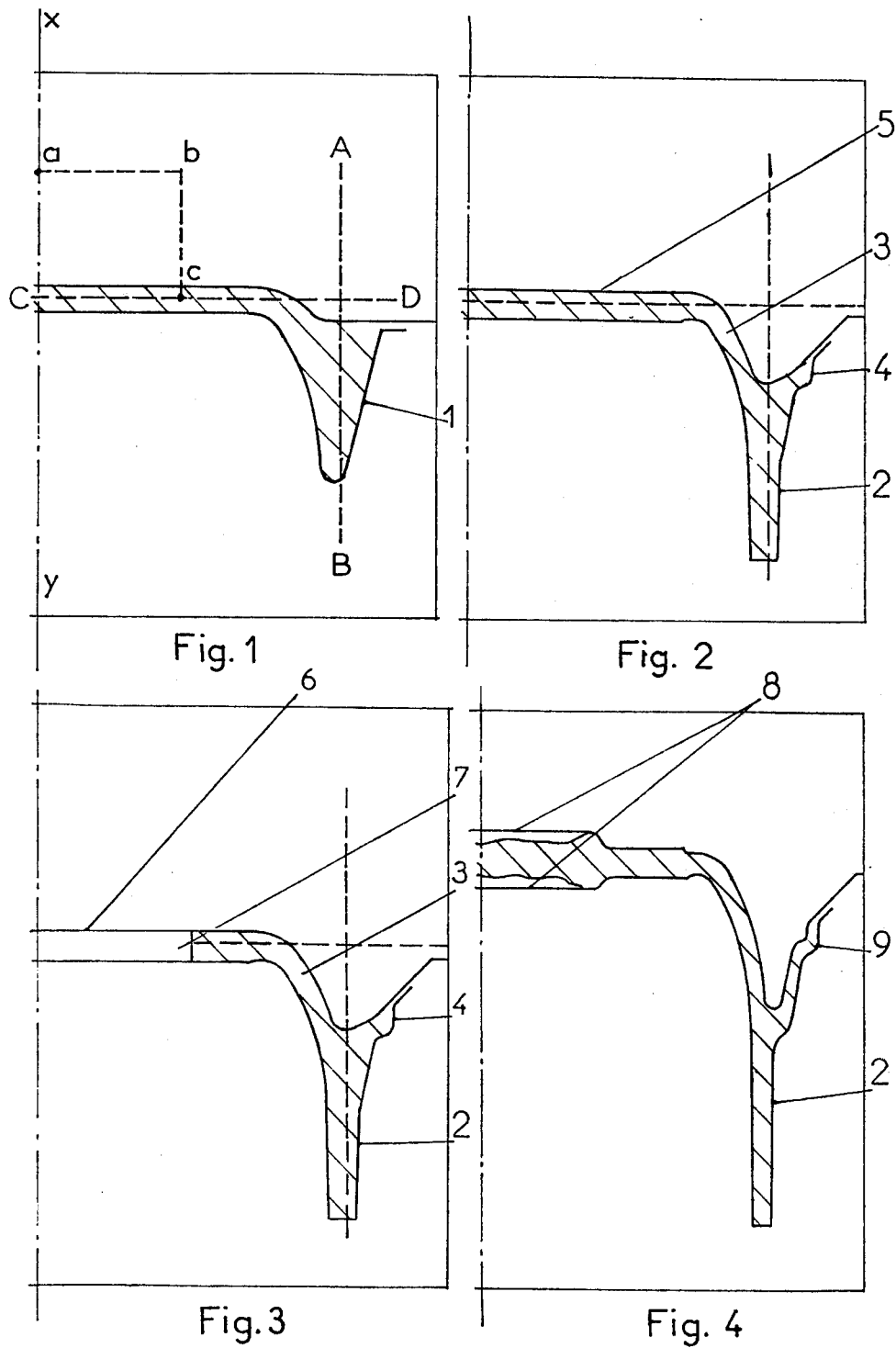

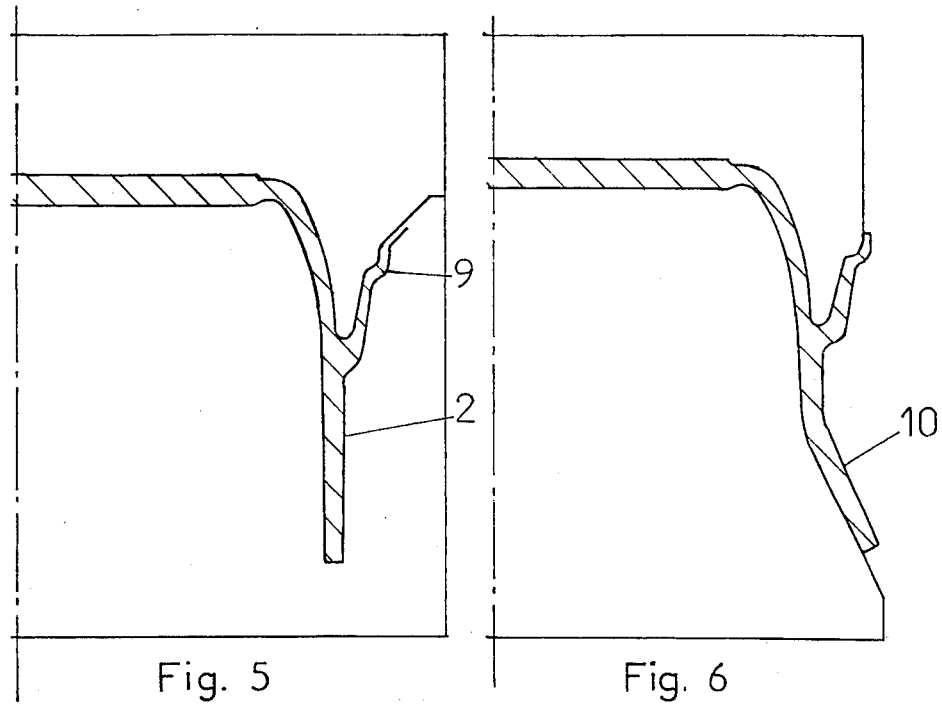
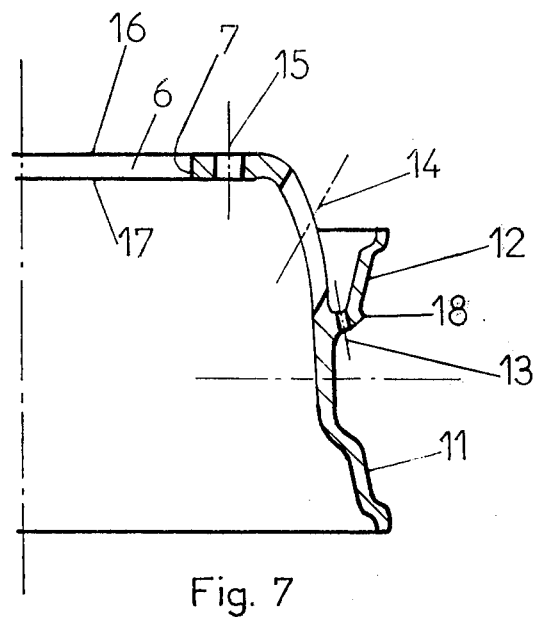

PROCESS FOR MANUFACTURING MONOBLOC VEHICLE WHEELS

The present invention relates to a process for manufacturing monobloc (one-piece) wheels for large vehicles intended to support pneumatic tires with or preferably without innertubes by die stamping and press widening operations.

Basically, a wheel for a pneumatic tire includes a disc portion and a rim portion integrally attached thereto. The disc serves as the means to mount and secure the wheel to the hub of the vehicle and as such, is normally dish-shaped with a slightly concave surface turned toward the hub to provide a housing for the brake drum and associated brake mechanism. Ordinarily, the disc is provided with a number of aligned openings or holes to receive lugs, bolts or other fastening means for attaching the wheel to the hub or drum. In some examples, a central bore is provided in the disc to accommodate the axle stub.

The rim portion may have a flat or a hollow base. In the case of hollow base wheels, there are no separable elements such as clincher rings or the like and such wheels are particularly suitable for tubeless type tires since it is relatively easy to make the rim-tire combination airtight. The rim or tire supporting portion includes a pair of walls or flanges, each of which is conical in form (the angle of conicity being generally 15° with respect to the axis of the wheel) and each wall defines a seat intended to receive one of the beads of the tire. Each seat terminates in a short hook-shaped flange portion. Part of one of the flange portions is generally referred to as the small flange. A second flange is directed axially toward the interior of the vehicle and is called the large flange, the size difference between the flanges deriving from the asymmetric position of the connecting zone or web between the disc and the rim.

Wheels for large vehicles are normally made from stamped and welded sheet steel. This method of manufacture is suitable for mass production and is relatively inexpensive. A welded assembly, however, does not lend itself well to the rigorous balancing and centering of the wheel and above all, to an air-tight construction which is absolutely essential if tubeless tires are to be employed. Many attempts have been made in the past to produce monobloc wheels and in particular wheels fabricated from light, aluminum-based alloys, but known examples of these efforts have not been particularly successful.

A heavy truck often employs as many as twelve to eighteen wheels and is also equipped with one or more spare wheels and thus, the total weight of the wheels themselves may amount to 1500 to 2000 lbs. (700–900 kg) if the wheels are fabricated from sheet steel by conventional welding operations. The use of monobloc wheels made of lightweight high strength alloys provide a significant reduction in weight and present additional advantages which will become more apparent hereinafter.

The attempts to produce wheels from light alloys or combination of light alloys and steel by various processes have been described in U.S. Pat. Nos. 2,075,294, 2,170,617, as well as in U.K. patent specifications Nos. 507,801, 971,258, 971,259, in German Pat. and/or applications Nos. 1,297,570, 1,908,465, and in French Pat. Nos. 1,186,248, 1,491,859, and 1,570,620. However, none of the known processes referred to above have produced a monobloc wheel offering satisfactory performance capabilities in solution to technological or economic conditions previously mentioned.

This situation is based primarily on the fact that known techniques do not lend themselves to mass production at an acceptable cost or because the wheels obtained by these various processes do not have the structural characteristics demanded by the users. Specifically, mechanical strength, impact resistance, corrosion resistance (particularly important in regions where salts are employed to assist in the melting of snow), ease of maintenance and servicing (non-tarnishing), ease of balancing and centering, the capability of maintaining the significant internal pressures normally employed with tubeless truck tires, and accuracy in all critical dimensional detail, thus enabling tires of all available types to be safely employed without risk of failure in service.

The present invention describes a process for producing monobloc wheels for large vehicles which lends itself to mass production and it is therefore an object of this invention to provide wheels which meet all of the requirements of users without the objections heretofore enumerated above.

The process is characterized by a sequence of die stamping steps beginning with a blank having the basic shape of a cylindrical disc and concluding with a final machining step.

The die stamping operations may vary in number depending upon the metal or metal alloy employed. In the particular case where a light, aluminum-based alloy is utilized, three die stamping steps have proved sufficient.

In the first step, a thick bead is formed on the circumference of the cylindrical disc in a direction substantially parallel to the axis of the wheel, that is toward the interior of said wheel as previously mentioned. This bead will ultimately be further shaped to define a small flange on the exterior of the wheel and a large flange on the interior of the wheel.

The second step produces the elongation and narrowing of the bead formed in the first step to a further extent and in the same direction as that produced in the first step and forms the rudimentary shape of the small (exterior) flange of the rim.

The third die stamping step configures the small flange to a form approximately its final shape and further shapes the lower portion to a configuration substantially equal to the length of the large flange. A subsequent widening step of the part shaped in the preceding step is then conducted in a press to form the channel of the rim.

The process may be concluded by machining the external part of the rim to remove surface irregularities and impart a machine finish to the critical areas of the rim which will engage the tire bead. In some instances, it has been found that during the die stamping stages, there is a certain amount of flow of excess metal from the central disc area in a direction of the junction between the disc and the bead which supports the flanges. It has been found that this flow can be accommodated by allowing the excess metal to flow back toward the central part of the disc in a direction away from the junction between the disc and the flanges where it may be subsequently removed during the finishing operation in the mechanical machining step.

Accordingly, it is contemplated that one may proceed directly after the second die stamping step to form the central bore in the disc or in the alternative, provide a recess in the die used in the third stamping step to receive the excess metal referred to above. In either of these cases, the excess metal will ultimately be removed during the final mechanical machining step.

The final finishing procedures comprise a series of well known operations which are not peculiar to the process just described, but which by way of example may include the forming of the central bore (if not previously accomplished after the second die stamping step), smoothing the surfaces of the disc, drilling holes for bolts or lugs to secure the wheel to the axle of the vehicle, drilling the passage orifice for the valve stem and the access orifice for the valve stem of a twin wheel arrangement. Moreover, heat treating steps may be carried out either at the intermediate stages or at the final stages to confer the optimum structural characteristics on the metal and provide corrosion resistance.

Attention is now directed to the drawings wherein like numerals refer to like parts throughout the several views.

FIG. 1 is a fragmentary cross-sectional view of one-half of a metallic disc wherein a first bead forming die stamping step has been performed.

FIG. 2 is a cross-sectional fragmentary view of the disc after a second die stamping step has been performed.

FIG. 3 is a cross-sectional fragmentary view in which the central bore has been formed.

FIG. 4 is a cross-sectional fragmentary view of the rim of the wheel of this invention wherein the die is provided with recesses to accommodate metal flow.

FIG. 5 is a fragmentary cross-sectional view showing the wheel after a final die stamping operation.

FIG. 6 is a fragmentary cross-sectional view of the wheel illustrating the widening of the large flange to define the rim.

FIG. 7 is a fragmentary cross-sectional view of the rim with emphasis on those areas where machining operations will be performed.

Referring now to FIG. 1, a generally cylindrical blank is represented by the dotted line *abc*. In the first die stamping step, the wheel disc shown in cross section is formed with a bead 1 on its circumference oriented in the direction of the interior of the wheel. The principal axis AB of the bead 1 is substantially perpendicular to the plane of the disc CD and is consequently parallel to the axis $xy$ of the wheel. The first die stamping step is performed with the blank at an elevated temperature suitable for aluminum alloys of the aluminum-silicon-magnesium type, such as 6061, whose average composition is: aluminum base, silicon—0.60%, magnesium—1%, copper—0.30%, chromium—0.25%, iron < 0.50%, zinc < 0.25%, nickel < 0.05%. Approximately 475° C. has been found quite acceptable with the die stamping equipment at approximately 400° C.

FIG. 2 illustrates the second die stamping step and therein it can be seen that the bead 1 has been elongated to assume the general shape 2 and further includes the rudimentary shape of the small flange 4 of the rim. It has been noted that during the third die stamping step, there is a risk that in some cases a portion of the metal from the disc 5 will flow back toward the zone 3 where it may form undesired folds or creases. Accordingly, if the central bore 6 illustrated in FIG. 3 is formed immediately following the second die stamping step (FIG. 2) and before the third die stamping step (FIG. 5), such excess metal will tend to move toward the interior edge 7 of the bore, as best seen in FIG. 3 of the drawings, from which it may be conveniently removed during the final machining procedures.

Alternatively, if for any reason it is not desirable to proceed with the formation of the bore in the central disc at this time, the problem may be accommodated by the introduction of one or more recesses 8 in the die per se. Such recesses will accommodate any excess metal which may tend to accumulate and such metal may also be removed during the final machining steps.

The third die stamping step may be performed with the die equipped with a recess, as illustrated in FIG. 4, or a die without a recess, as illustrated in FIG. 5, to produce a further elongation of the portion 2 (FIG. 2) until the length thereof is substantially equal to the length required for the large flange and in addition, this step simultaneously forms the small flange 9 to a shape approximating its final configuration.

FIG. 6 is an illustration of the widening step forming the elongated part 2 to the configuration illustrated at 10, from which the large flange will be machined to its final form.

In FIG. 7, the localized areas to be finally machined are clearly illustrated and these include the large flange 11, the small flange 12, as well as the final form of the wheel after various finishing operations are performed. These operations will include, but may not be limited to the formation of the central bore 6, the drilling of the passage orifice 13 for the valve stem, the drilling of the access orifice 14 for the valve of a twin wheel arrangement, the passages 15 for the bolts or lugs for securing the wheel to the hub of the vehicle, the finishing of the surfaces 16 and 17 of the disc portion and the inner edge 7 of the central bore, and the configuration of the boss 18 may also be formed during this machining step. The boss 18 or "hump" as it is sometimes referred to, is provided to prevent any sudden disengagement of the tire when an underinflated or deflated condition exists following a puncture or other sudden loss of pressure.

The following example will aid in the comprehension of the process herein described, but should not be considered by way of limitation thereof.

EXAMPLE

A flat disc fabricated from A-SG/6061 alloy (whose composition is: aluminum base, Si—0.60%, Mg—1.0%, Fe < 0.50%, Zn < 0.25%, Cu—0.30%, Cr—0.25%, Ni < 0.05%) with a diameter of 300 mm and a thickness of 260 mm, is shaped according to the sequence of operations corresponding to the first variant namely: a first die stamping step in a press having a maximum capacity of 20,000 tons to a shape according to FIG. 1 at a temperature of about 475° C.; a second die stamping step under the same pressure and temperature conditions to a configuration according to FIG. 2; a third die stamping step under the same conditions to a configuration according to FIG. 5; and a widening step in the press to a configuration according to FIG. 6.

The final machining produces the wheel configuration as shown in FIG. 7. The wheel thus obtained has dimensions of 22.5-7.5 (expressed in inches of 25.4 mm as is the convention for this type of material, i.e. 57-19 cm) and takes standard size (11-225) tires. Its weight is approximately 23 kg, which is roughly half the weight of a conventional type of steel wheel (pressed and welded).

It may thus be seen that the total saving in weight for a truck equipped with this type of wheel may thus amount to 300 to 400 kg. Moreover, the high thermal conductivity of aluminum and its alloys helps considerably in removing and dissipating the heat generated by the braking system, thus reducing localized overheating which could be very harmful to the life of the tires and/or tubes. Futhermore, the reduction in weight of the wheels improves the comfort of the vehicle since there is less nonsuspended weight; while increasing braking efficiency by reducing the kinetic energy of the rotating masses which must be dissipated as heat during braking.

Of course, the operation of the invention is not limited to the alloy utilized in the example. All metal alloys capable of being shaped by die stamping and having satisfactory mechanical properties to constitute wheels of large vehicles fall within the scope of the invention.

We claim:

1. The process of manufacturing monobloc metal vehicle wheels including a central disc portion comprising a large and small flange area, a rim portion for pneumatic tires, and a junction zone between said disc and rim portions, said process comprising a shaping step beginning with a roughly shaped article in the form of a cylindrical disc and a finishing step involving mechanical machining wherein the shaping is effected by a combination of die stamping and press widening operations consisting of the following steps: a first die stamping step producing the wheel disc and simultaneously forming on its circumference a junction zone terminating in a thickened bead oriented in a direction substantially parallel to the axis of the wheel and the inner side of the wheel to define one part of the rim portion; a second die stamping step elongating said bead and said junction zone in the same general direction as in the preceding step and simultaneously forming the rough shape of a small flange portion of the rim on the bead adjacent the junction zone; a third die stamping step forming the small flange to a shape approximating its final form and simultaneously elongating the junction zone and the bead in the same direction as in steps one and two imparting thereto a length substantially equal to the final length of said junction zone and said bead to define the large flange portion of the rim; and a press widening of the elongated bead to a shape from which said large flange may be machined to finished form.

2. The process for manufacturing monobloc metal vehicle wheels according to claim 1 wherein a central bore is formed in said disc after the second die stamping step and before the third die stamping step.

3. The process for manufacturing monobloc metal vehicle wheels according to claim 1 wherein at least one recess is provided in the die for step three in which excess metal flowing from the central disc accumulates.

4. The process for manufacturing monobloc metal vehicle wheels according to claim 1 wherein an annular boss is formed during the mechanical machining step adjacent the point of interconnection for the junction zone and the small flange of the rim.

* * * * *